US012181830B2

(12) United States Patent
Sato

(10) Patent No.: US 12,181,830 B2
(45) Date of Patent: Dec. 31, 2024

(54) IMAGE FORMING APPARATUS

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/471,269

(22) Filed: Sep. 20, 2023

(65) Prior Publication Data

US 2024/0012358 A1 Jan. 11, 2024

Related U.S. Application Data

(63) Continuation of application No. 17/955,471, filed on Sep. 28, 2022, now Pat. No. 11,815,847, which is a continuation of application No. 17/116,645, filed on Dec. 9, 2020, now Pat. No. 11,480,915, which is a continuation of application No. 16/443,110, filed on Jun. 17, 2019, now Pat. No. 10,866,560.

(30) Foreign Application Priority Data

Jun. 19, 2018 (JP) ................................ 2018-116238

(51) Int. Cl.
*G03G 21/18* (2006.01)

(52) U.S. Cl.
CPC .................................. *G03G 21/185* (2013.01)

(58) Field of Classification Search
CPC .................................................... G03G 21/185
See application file for complete search history.

(56) References Cited

U.S. PATENT DOCUMENTS

| | | | |
|---|---|---|---|
| 4,866,482 | A | 9/1989 | Hirasawa et al. |
| 11,119,438 | B2 | 9/2021 | Sato et al. |
| 2004/0179859 | A1 | 9/2004 | Ishii |
| 2004/0190932 | A1 | 9/2004 | Ishii |
| 2012/0294646 | A1 | 11/2012 | Suzuki et al. |
| 2014/0016980 | A1 | 1/2014 | Minoshima |
| 2014/0205321 | A1 | 7/2014 | Jang et al. |

(Continued)

FOREIGN PATENT DOCUMENTS

| | | |
|---|---|---|
| JP | 2002-207408 A | 7/2002 |
| JP | 2004-279704 A | 10/2004 |

(Continued)

*Primary Examiner* — Walter L Lindsay, Jr.
*Assistant Examiner* — Andrew V Do
(74) *Attorney, Agent, or Firm* — KENEALY VAIDYA LLP

(57) ABSTRACT

An image forming apparatus includes a main body housing, a drawer, a drum cartridge, an exposure device, developing cartridge, a transfer roller, and a fixing device. The drum cartridge includes a photosensitive drum and is attachable to and detachable from a first supporting position on the drawer. The developing cartridge is attachable to and detachable from a second supporting position on the drawer and includes a developing roller. The drawer includes a first guide. The drum cartridge includes a second guide. In a state where the drum cartridge is attached to the first supporting position on the drawer, the first guide of the drawer and the second guide of the drum cartridge form a developing cartridge guide configured to guide the developing cartridge toward the second supporting position on the drawer.

7 Claims, 9 Drawing Sheets

(56) References Cited

U.S. PATENT DOCUMENTS

| | | | |
|---|---|---|---|
| 2016/0154341 | A1 | 6/2016 | Hamada et al. |
| 2017/0003645 | A1 | 1/2017 | Kawakami et al. |
| 2019/0278216 | A1 | 9/2019 | Tomatsu |
| 2020/0142350 | A1 | 5/2020 | Yokoi et al. |

FOREIGN PATENT DOCUMENTS

| | | | |
|---|---|---|---|
| JP | 2004-301944 | A | 10/2004 |
| JP | 2006-58350 | A | 3/2006 |
| JP | 2016-110097 | A | 6/2016 |

IMAGE FORMING APPARATUS

CROSS-REFERENCE TO RELATED APPLICATIONS

This application is a continuation application claiming priority benefit under 35 U.S.C. 120 of U.S. patent application Ser. No. 17/955,471 filed on Sep. 28, 2022 and U.S. patent application Ser. No. 17/116,645 filed on Dec. 9, 2020 which issued as U.S. Pat. No. 11,480,915 on Oct. 25, 2022 and U.S. patent application Ser. No. 16/443,110 filed on Jun. 17, 2019 which issued as U.S. Pat. No. 10,866,560 on Dec. 15, 2020, and is based upon and claims the benefit of priority under 35 U.S.C. 119 from Japanese patent application No. 2018-116238, filed on Jun. 19, 2018, the entire contents of all of which are incorporated herein by reference.

TECHNICAL FIELD

The present disclosure relates to an image forming apparatus.

BACKGROUND

In related art, an image forming apparatus includes a main body housing, a drawer, and a process cartridge. The drawer is movable between an inner position located inside the main body housing and an outer position located outside the main body housing. The process cartridge is attachable to and detachable from the drawer. The process cartridge includes a photosensitive drum and a developing roller configured to form a toner image by developing a latent image formed on the photosensitive drum with toner. The process cartridge is capable of accommodating therein the toner.

In the image forming apparatus as disclosed in related art, the process cartridge includes the photosensitive drum and the developing roller.

For this reason, for example, when a remaining amount of toner in the process cartridge is reduced, the entire process cartridge including the photosensitive drum needs to be replaced even though it is not necessary to replace the photosensitive drum. As a result, it is difficult to save the cost.

SUMMARY

Aspect of non-limiting embodiments of the present disclosure provides an image forming apparatus including a drawer in which a drum cartridge including a photosensitive drum and a developing cartridge including a developing roller can be individually replaced.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an image forming apparatus including: a main body housing; a drawer movable between an inner position located inside the main body housing and an outer position located outside the main body housing; a drum cartridge including a photosensitive drum and attachable to and detachable from a first supporting position on the drawer; an exposure device configured to expose the photosensitive drum to form a latent image on a peripheral surface of the photosensitive drum; a developing cartridge attachable to and detachable from a second supporting position on the drawer, the developing cartridge including a developing roller configured to form a toner image by developing the latent image formed on the photosensitive drum by toner; a transfer roller configured to transfer the toner image formed on the photosensitive drum to a printing medium, and a fixing device configured to fix the toner image, which has been transferred to the printing medium, on the printing medium, wherein the drawer includes a first guide, wherein the drum cartridge includes a second guide, and wherein, in a state where the drum cartridge is attached to the first supporting position on the drawer, the first guide of the drawer and the second guide of the drum cartridge forms a developing cartridge guide configured to guide the developing cartridge toward the second supporting position on the drawer.

According to another aspect of the present disclosure, there is provided an image forming apparatus configured to form an image on a printing medium by using: a drum cartridge including a photosensitive drum; and a developing cartridge including a developing roller configured to form a toner image by developing a latent image formed on the photosensitive drum with toner, the image forming apparatus including: a drawer configured to support the drum cartridge at a first supporting position and configured to support the developing cartridge at a second supporting position, the drawer including a projection; a main body housing having a guide groove configured to guide the projection of the drawer; an exposure device configured to expose the photosensitive drum to form a latent image on a peripheral surface of the photosensitive drum; a transfer roller configured to transfer the toner image formed on the photosensitive drum to the printing medium, and a fixing device configured to fix the toner image, which has been transferred to the printing medium, on the printing medium, wherein the drawer is movable between an outer position and an inner position as the projection is guided along the guide groove, the outer position being a position at which the drawer is pulled out from the main body housing and the projection is in contact with a first end of the guide groove, and the inner position being a position at which the drawer is accommodated in the main body housing and the projection is in contact with a second end of the guide groove opposite to the first end, wherein the drawer includes a first guide, wherein the drum cartridge includes a second guide, and wherein, in a state where the drum cartridge is attached to the drawer, the first guide of the drawer and the second guide of the drum cartridge forms a developing cartridge guide configured to guide the developing cartridge toward the second supporting position on the drawer.

DETAILED DESCRIPTION

1. Outline of Image Forming Apparatus 1

Figure 1:
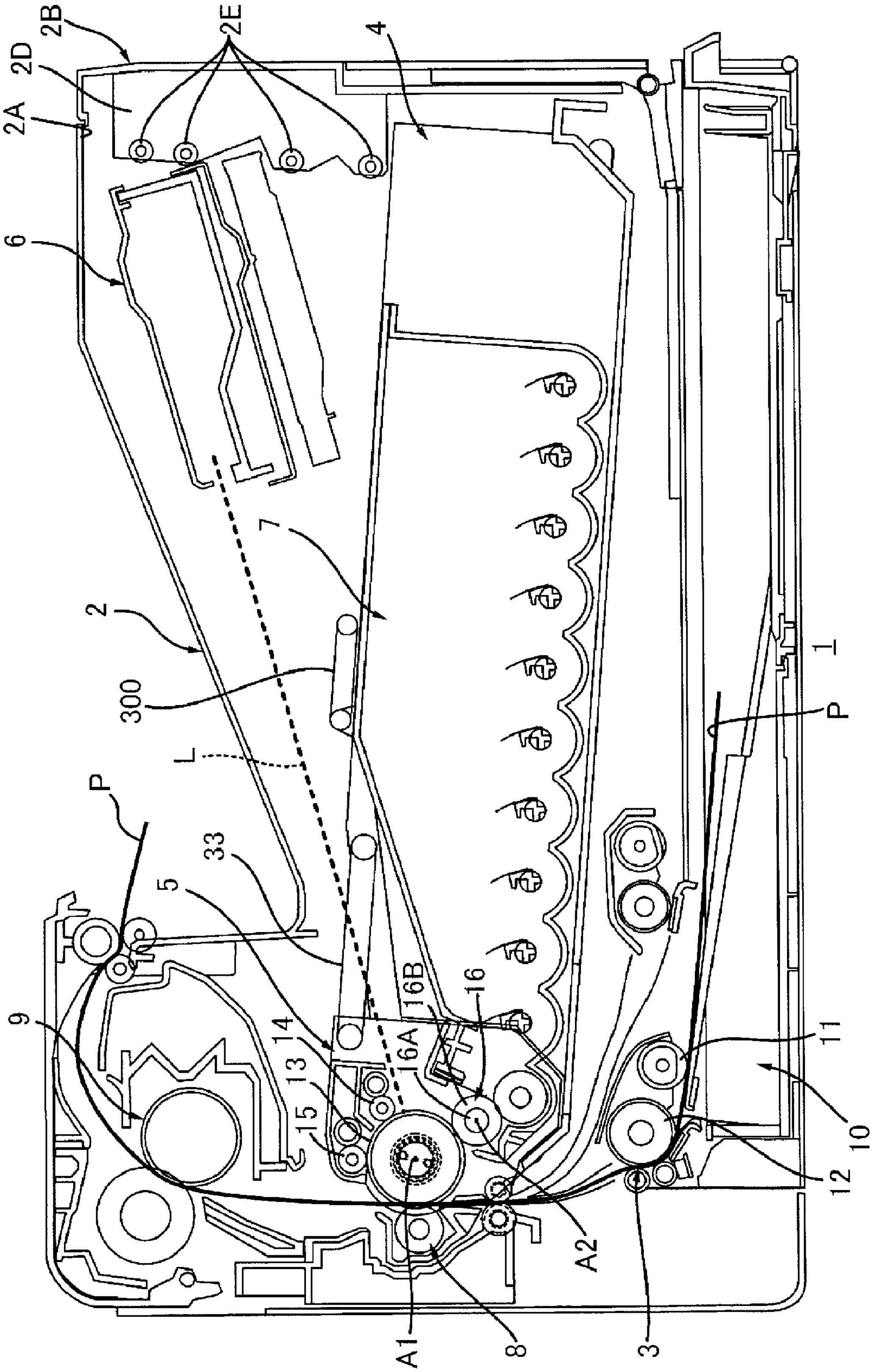
FIG. 1 is a schematic configuration view of an image forming apparatus.
Figure 2:
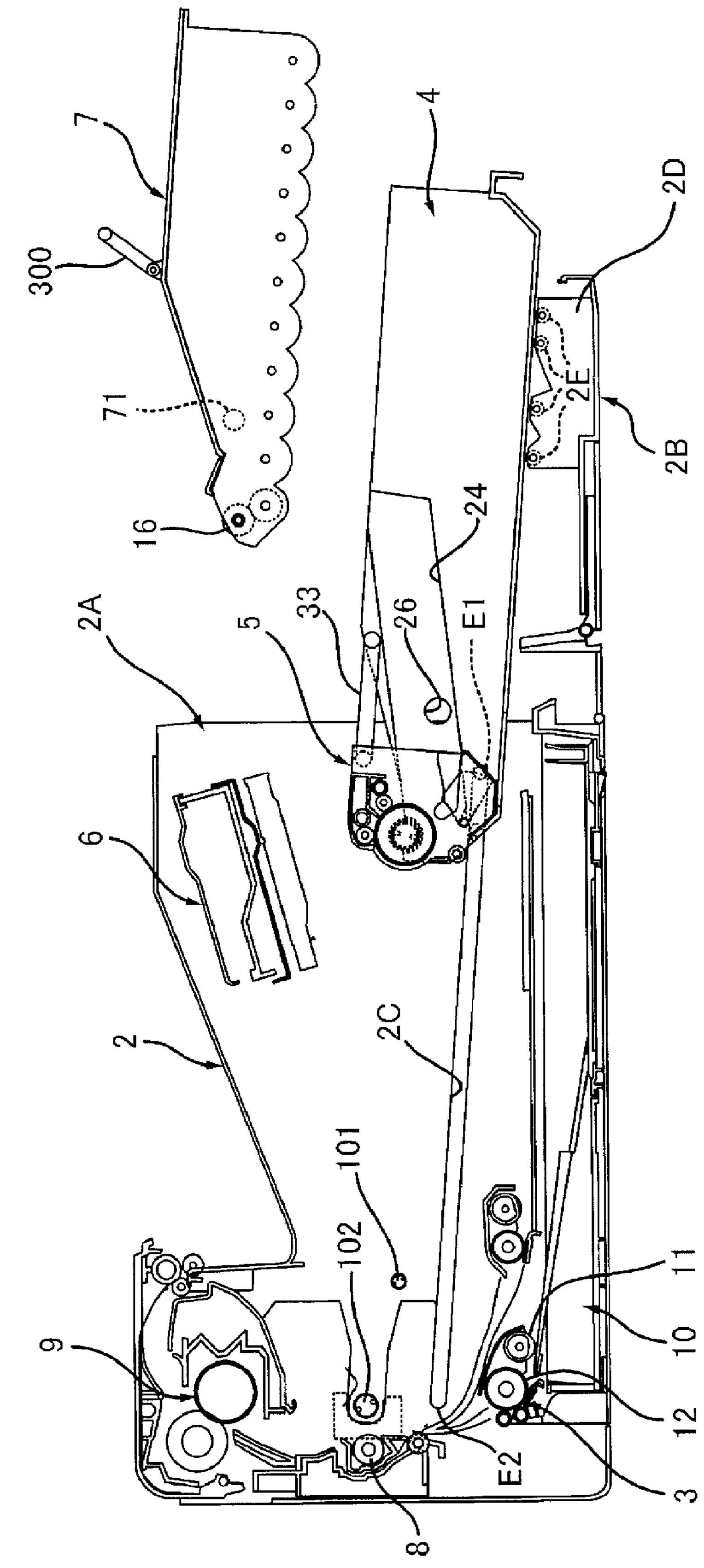
FIG. 2 depicts a state where a drawer shown in FIG. 1 is located at an outer position and a developing cartridge is demounted from the drawer.

Referring to FIGS. 1 and 2, an outline of an image forming apparatus 1 is described.

As shown in FIG. 1, the image forming apparatus 1 includes a main body housing 2, a feeder unit 3, a drawer 4, a drum cartridge 5, an exposure device 6, a developing cartridge 7, a transfer roller 8, and a fixing device 9. In the meantime, the image forming apparatus 1 includes one drum cartridge 5 and one developing cartridge 7 and is a dedicated image forming apparatus for single color printing.

1.1 Main Body Housing

The main body housing 2 is configured to accommodate therein the feeder unit 3, the drawer 4, the drum cartridge 5, the exposure device 6, the developing cartridge 7, the transfer roller 8, and the fixing device 9. The main body housing 2 has an opening 2A and a cover 2B.

The opening 2A is located at an opposite side to the transfer roller 8 with respect to the drum cartridge 5 in a state where the drum cartridge 5 is attached to the main body housing 2.

The cover 2B is movable between a closing position (see FIG. 1) at which the opening 2A is closed and an opening position (see FIG. 2) at which the opening 2A is opened.

1.2 Feeder Unit

The feeder unit 3 is configured to feed a printing medium P to a photosensitive drum 13. The printing medium P is, for example, a printing sheet. The photosensitive drum 13 will be described later. The feeder unit 3 includes a sheet feeding tray 10, a pickup roller 11, and a feeder roller 12. The sheet feeding tray 10 is configured to accommodate therein the printing medium P. The pickup roller 11 is configured to convey the printing medium P in the sheet feeding tray 10 toward the feeder roller 12. The feeder roller 12 is configured to convey the printing medium P from the pickup roller 11 toward the photosensitive drum 13.

1.3 Drawer

The drawer 4 is movable between an inner position (see FIG. 1) and an outer position (see FIG. 2). When the drawer 4 is located at the inner position, the drawer 4 is located inside the main body housing 2. When the drawer 4 is located at the outer position, the drawer 4 is located outside the main body housing 2. The drawer 4 is configured to move downward as the drawer 4 moves from the inner position toward the outer position. The drawer 4 is configured to support the drum cartridge 5 and the developing cartridge 7. The drawer 4 is movable between the inner position and the outer position while supporting the drum cartridge 5 and the developing cartridge 7. The drawer 4 is configured to come into contact with a part of the main body housing 2 and to be thus stopped at the outer position.

Specifically, as shown in FIG. 2, the main body housing 2 has a guide groove 2C. The guide groove 2C extends in a moving direction of the drawer 4. The guide groove 2C has a first end E1 and a second end E2 in the moving direction of the drawer 4. The second end E2 is spaced from the first end E1 in the moving direction of the drawer 4. Also, the drawer 4 has a projection 4A (see FIG. 5). The projection 4A is located on a side surface of the drawer 4 in an axial direction that is a direction in which a rotary axis A1 of the photosensitive drum 13 extends. The projection 4A is fitted in the guide groove 2C. Thereby, the drawer 4 can move along the guide groove 2C.

That is, the guide groove 2C is configured to guide the projection 4A so that the drawer 4 can move between the outer position and the inner position.

While the drawer 4 is moved from the outer position toward the inner position, when the drawer 4 reaches the inner position, the projection 4A comes into contact with the second end E2 of the guide groove 2C, so that the drawer 4 is stopped at the inner position. When the drawer 4 is located at the inner position, the photosensitive drum 13 is in contact with the transfer roller 8.

Also, while the drawer 4 is moved from the inner position toward the outer position, when the drawer 4 reaches the outer position, the projection 4A comes into contact with the first end E1 of the guide groove 2C, so that the drawer 4 is stopped at the outer position.

In the state where the drawer 4 is located at the outer position, the drawer 4 is supported by the cover 2B. Specifically, the cover 2B has a support part 2D. The support part 2D is in contact with a lower surface of the drawer 4 in the state where the cover 2B is located at the opening position and the drawer 4 is located at the outer position. Thereby, the support part 2D supports the drawer 4 located at the outer position. Also, the support part 2D has a plurality of guide rollers 2E. The plurality of guide rollers 2E is in contact with the lower surface of the drawer 4 in the state where the cover 2B is located at the opening position and the drawer 4 is located at the outer position. Thereby, the drawer 4 can be smoothly moved while being supported by the cover 2B.

1.4 Drum Cartridge

As shown in FIG. 1, the drum cartridge 5 is attachable to and detachable from a first supporting position on the drawer 4. The drum cartridge 5 includes a photosensitive drum 13, a charging roller 14 and a primary holding roller 15.

Figure 3:
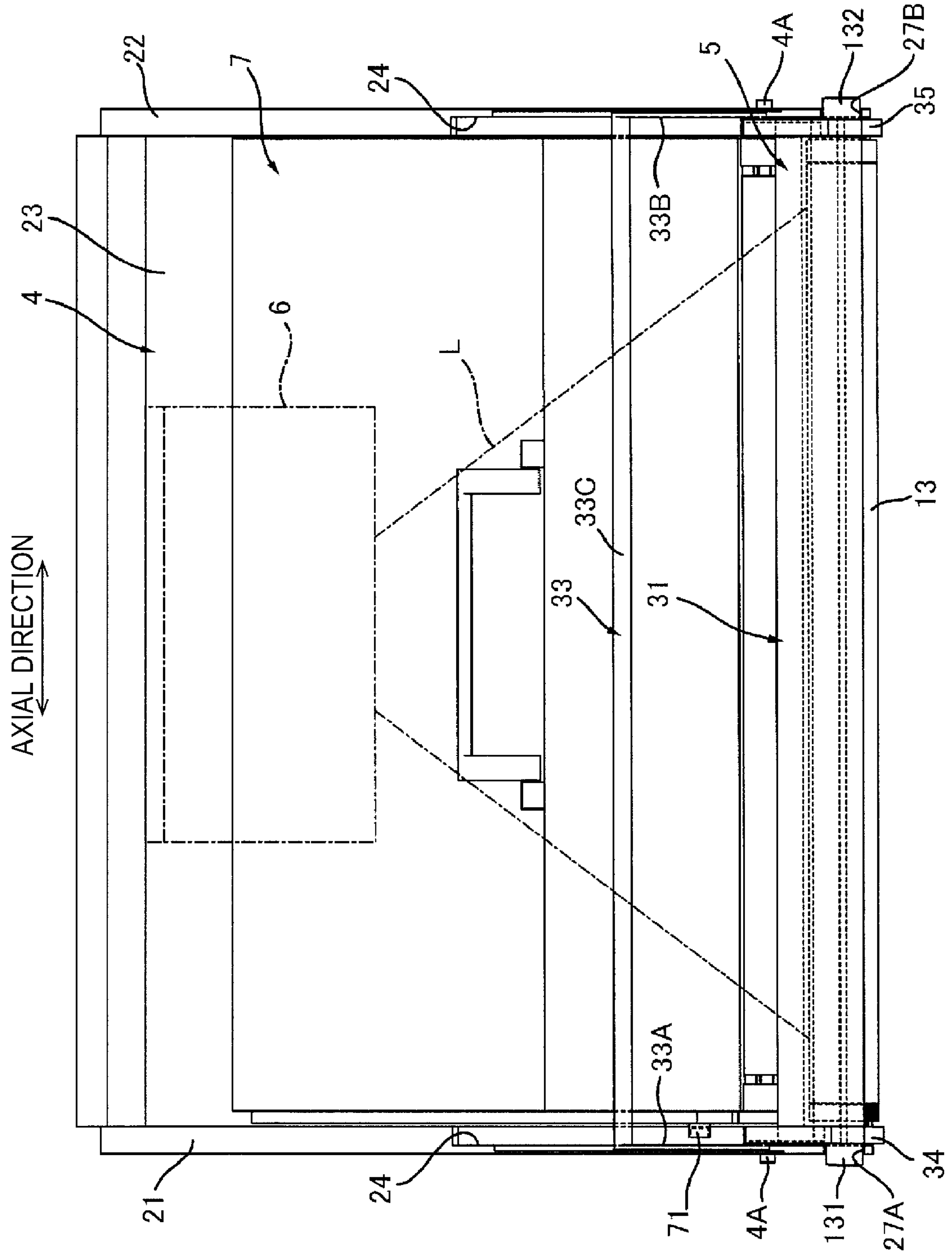
FIG. 3 illustrates a scanning range of a laser scan unit shown in FIG. 1.
Figure 4:
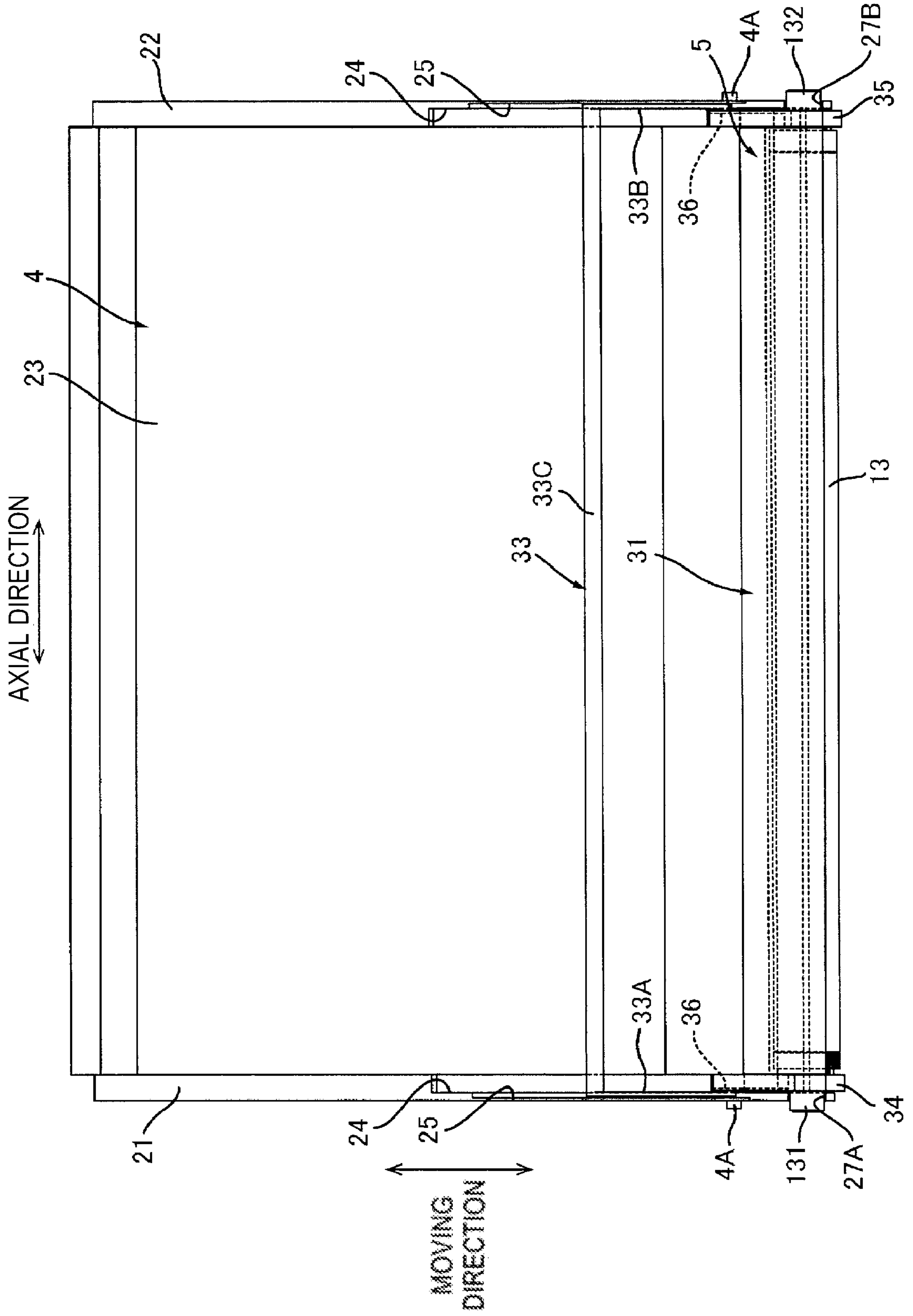
FIG. 4 is a plan view of the drawer shown in FIG. 1, depicting a state where a drum cartridge is attached to the drawer and the developing cartridge is demounted from the drawer.

The photosensitive drum 13 is configured to be rotatable about the rotary axis A1 extending in the axial direction. The axial direction intersects with the moving direction of the drawer 4. Preferably, the axial direction is perpendicular to the moving direction of the drawer 4. The photosensitive drum 13 extends in the axial direction, and has a cylindrical shape. As shown in FIGS. 3 and 4, the photosensitive drum 13 has a drum coupling 131 and a drum flange 132. The drum coupling 131 is located at a first end of the photosensitive drum 13 in the axial direction. The drum flange 132 is located at a second end of the photosensitive drum 13 in the axial direction.

Meanwhile, as shown in FIG. 1, in the exemplary embodiment, in the state where the drum cartridge 5 and the developing cartridge 7 are attached to the drawer 4 and the drawer 4 is located at the inner position, the photosensitive drum 13 is located between the feeder roller 12 and the fixing device 9 in a vertical direction.

The charging roller 14 is configured to charge a peripheral surface of the photosensitive drum 13. The charging roller 14 is in contact with the peripheral surface of the photosensitive drum 13. In the meantime, the drum cartridge 5 may include a non-contact type charger such as a scorotron-type charger, instead of the charging roller 14.

The primary holding roller 15 is configured to temporarily hold toner left after transfer. The toner left after transfer means toner left on a surface of the photosensitive drum 13 after the toner image has been transferred from the photosensitive drum 13 to the printing medium P by the transfer roller 8. The toner left after transfer held by the primary holding roller 15 is transferred from the primary holding roller 15 to the photosensitive drum 13 and is then collected into the developing cartridge 7 by the developing roller 16 while the image forming apparatus 1 does not execute the printing.

1.5 Exposure Device

The exposure device 6 is configured to expose the photosensitive drum 13 to form a latent image on a peripheral surface of the photosensitive drum 13. Specifically, the exposure device 6 is configured to expose the peripheral surface of the photosensitive drum 13 charged by the charging roller 14. Thereby, a latent image is formed on the peripheral surface of the photosensitive drum 13. The exposure device 6 is located above the drawer 4 located at the inner position. Specifically, the exposure device 6 is a laser scan unit configured to scan the peripheral surface of the photosensitive drum 13 with a laser light L. As shown in FIG. 3, the laser light L emitted from the exposure device 6 toward the photosensitive drum 13 passes between a first arm 33A and A second arm 33B of a handle 33 of the drum cartridge 5 in the axial direction in the state where the drum cartridge 5 is attached to the first supporting position on the drawer 4 and the drawer 4 is located at the inner position.

1.6 Developing Cartridge

As shown in FIG. 1, the developing cartridge 7 is attachable to and detachable from a second supporting position on the drawer 4. The developing cartridge 7 can accommodate therein the toner. The developing cartridge 7 includes a developing roller 16 and a handle 300.

The developing roller 16 is in contact with the photosensitive drum 13 in the state where the drum cartridge 5 and the developing cartridge 7 are attached to the drawer 4. Thereby, the developing roller 16 can supply the toner in the developing cartridge 7 to the photosensitive drum 13 in the state where the drum cartridge 5 and the developing cartridge 7 are attached to the drawer 4. The developing roller 16 is configured to supply the toner in the developing cartridge 7 to the photosensitive drum 13, thereby developing a latent image formed on the photosensitive drum 13 to form a toner image on the peripheral surface of the photosensitive drum 13. The developing roller 16 has a shaft 16A and a roller body 16B.

The shaft 16A extends in the axial direction. The shaft 16A has a circular column shape. The shaft 16A penetrates the roller body 16B in the axial direction. The shaft 16A is made of metal.

The roller body 16B extends in the axial direction. The roller body 16B has a circular column shape. The roller body 16B is made of a conductive rubber.

The handle 300 is a part that is gripped by a user when mounting and demounting the developing cartridge 7 to and from the drawer 4. The handle 300 is attached to an upper surface of the developing cartridge 7. The handle 300 is preferably attached to a part close to a gravity center of a brand-new developing cartridge 7 having toner filled therein. Thereby, as shown in FIG. 2, when the user lifts the developing cartridge 7 by gripping the handle 300, a posture of the developing cartridge 7 is substantially horizontal. For this reason, the developing cartridge 7 can be easily mounted to the drawer 4.

1.7 Transfer Roller

As shown in FIG. 1, the transfer roller 8 is in contact with the photosensitive drum 13 in the state where the drum cartridge 5 is attached to the first supporting position on the drawer 4 and the drawer 4 is located at the inner position. The printing medium P fed from the sheet feeding tray 10 passes between the transfer roller 8 and the photosensitive drum 13. At this time, the transfer roller 8 is configured to transfer the toner image formed on the photosensitive drum 13 to the printing medium P.

1.8 Fixing Device

The fixing device 9 is configured to heat and press the printing medium P having the toner image transferred thereto, thereby fixing the toner image, which has been transferred to the printing medium P, on the printing medium P. The printing medium P having passed through the fixing device 9 is discharged on an upper surface of the main body housing 2. The fixing device 9 is located with being spaced upward from the photosensitive drum 13 in the state where the drum cartridge 5 is attached to the first supporting position on the drawer 4 and the drawer 4 is located at the inner position. That is, the image forming apparatus 1 is equipped on a horizontal stand or the like so that the fixing device 9 is located above the photosensitive drum 13 in the vertical direction.

2. Details of Drawer

Subsequently, details of the drawer 4 are described with reference to FIGS. 4 to 8.

As shown in FIG. 4, the drawer 4 includes a first drawer side plate 21, a second drawer side plate 22, and a bottom plate 23.

Figure 5:
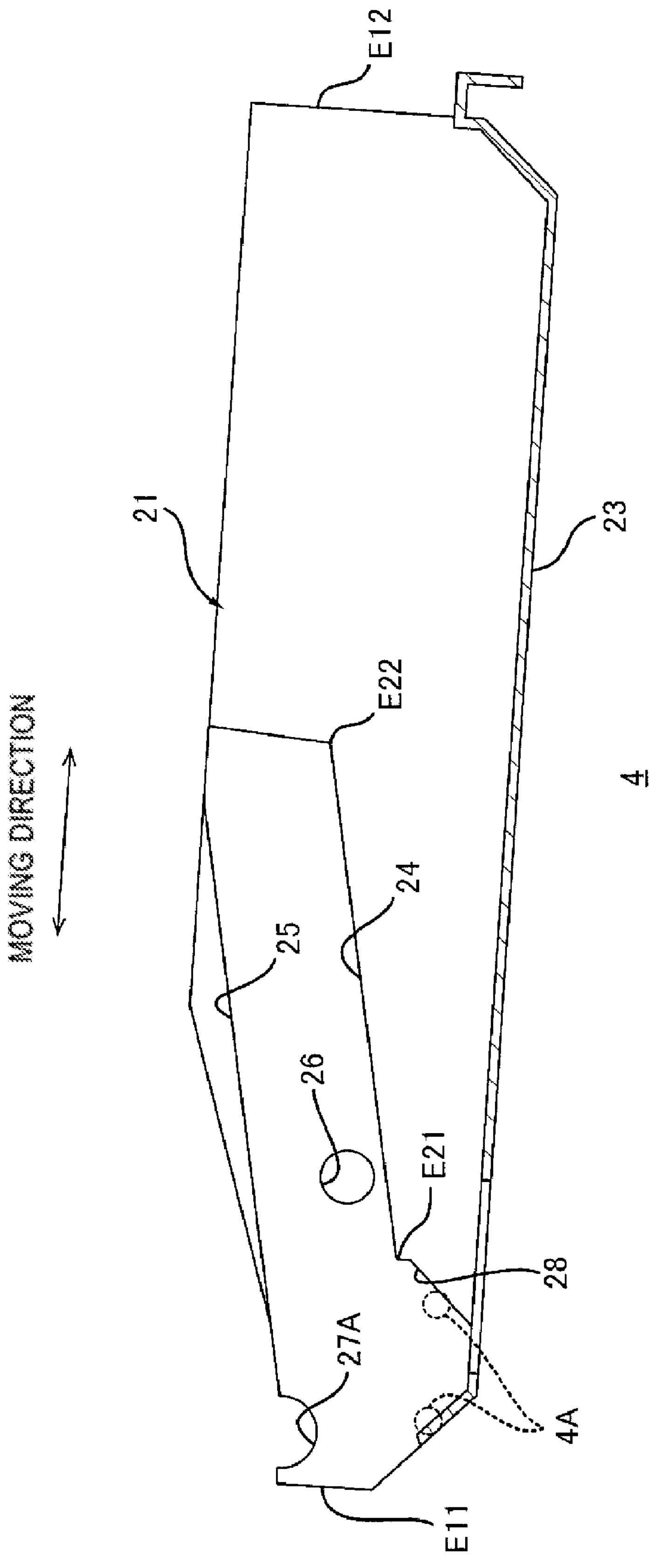
FIG. 5 is a sectional view of the drawer shown in FIG. 1 at an axial center.

The first drawer side plate 21 is located at a first end of the drawer 4 in the axial direction. The first drawer side plate 21 extends in the moving direction of the drawer 4. As shown in FIG. 5, the first drawer side plate 21 has a first end E11 and a second end E12 in the moving direction of the drawer 4. The second end E12 is spaced from the first end E11 in the moving direction of the drawer 4. The second end E12 is located downstream of the first end E11 in a direction in which the drawer 4 moves from the inner position toward the outer position. Also, the first drawer side plate 21 has a first guide 24, a handle support part 25, a through-hole 26, a notch 27A, and a concave part 28. That is, the drawer 4 has the first guide 24.

The first guide 24 is located on an inner surface of the first drawer side plate 21 in the axial direction. The first guide 24 is concave in a direction of getting away from the second drawer side plate 22 in the axial direction. The first guide 24 is located between the first end E11 and the second end E12 in the moving direction of the drawer 4. The first guide 24 extends in a direction of intersecting with the moving direction of the drawer 4. The first guide 24 has a first end E21 and a second end E22. The first end E21 is located closer to the first end E11 than the second end E22 in the moving direction of the drawer 4. The second end E22 is located closer to the second end E12 than the first end E21 in the moving direction of the drawer 4. The first guide 24 is inclined downward from the second end E22 toward the first end E21.

Figure 7:
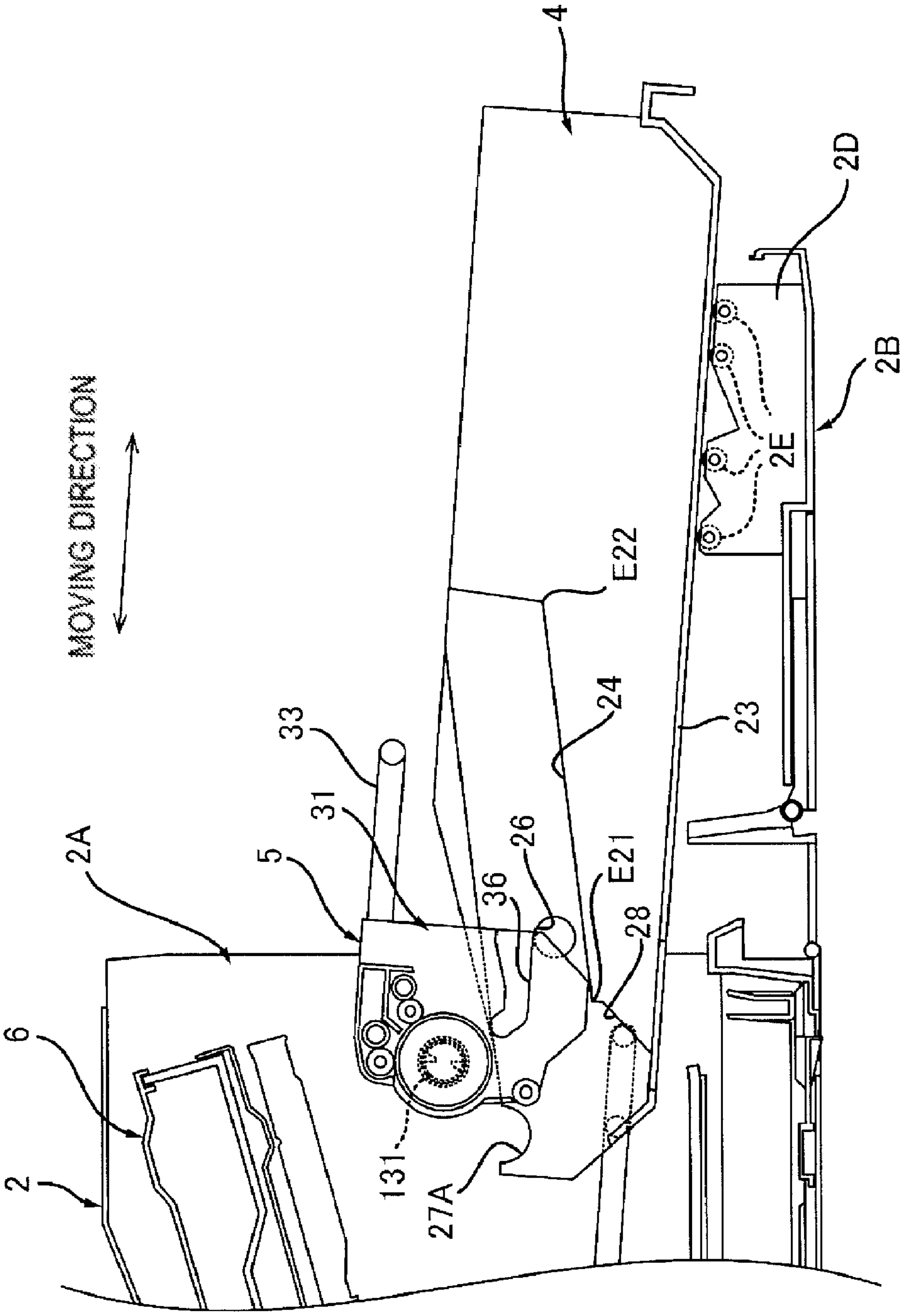
FIG. 7 illustrates mounting of the drum cartridge to the drawer.

As shown in FIG. 7, in the state where the drawer 4 is located at the outer position, the first end E21 of the first guide 24 is located at a more inner side than the opening 2A of the main body housing 2, and the second end E22 of the first guide 24 is located at an outermore side than the opening 2A of the main body housing 2. In the state where the drawer 4 is located at the outer position and when the drum cartridge 5 is attached to the drawer 4, the first guide 24 guides an end portion of the frame 31 of the drum cartridge 5 while coming in contact with the end portion of the frame 31 of the drum cartridge 5. Thereby, the first guide 24 guides the drum cartridge 5 when the drum cartridge 5 is attached to the drawer 4 in the state where the drawer 4 is located at the outer position.

Figure 8:
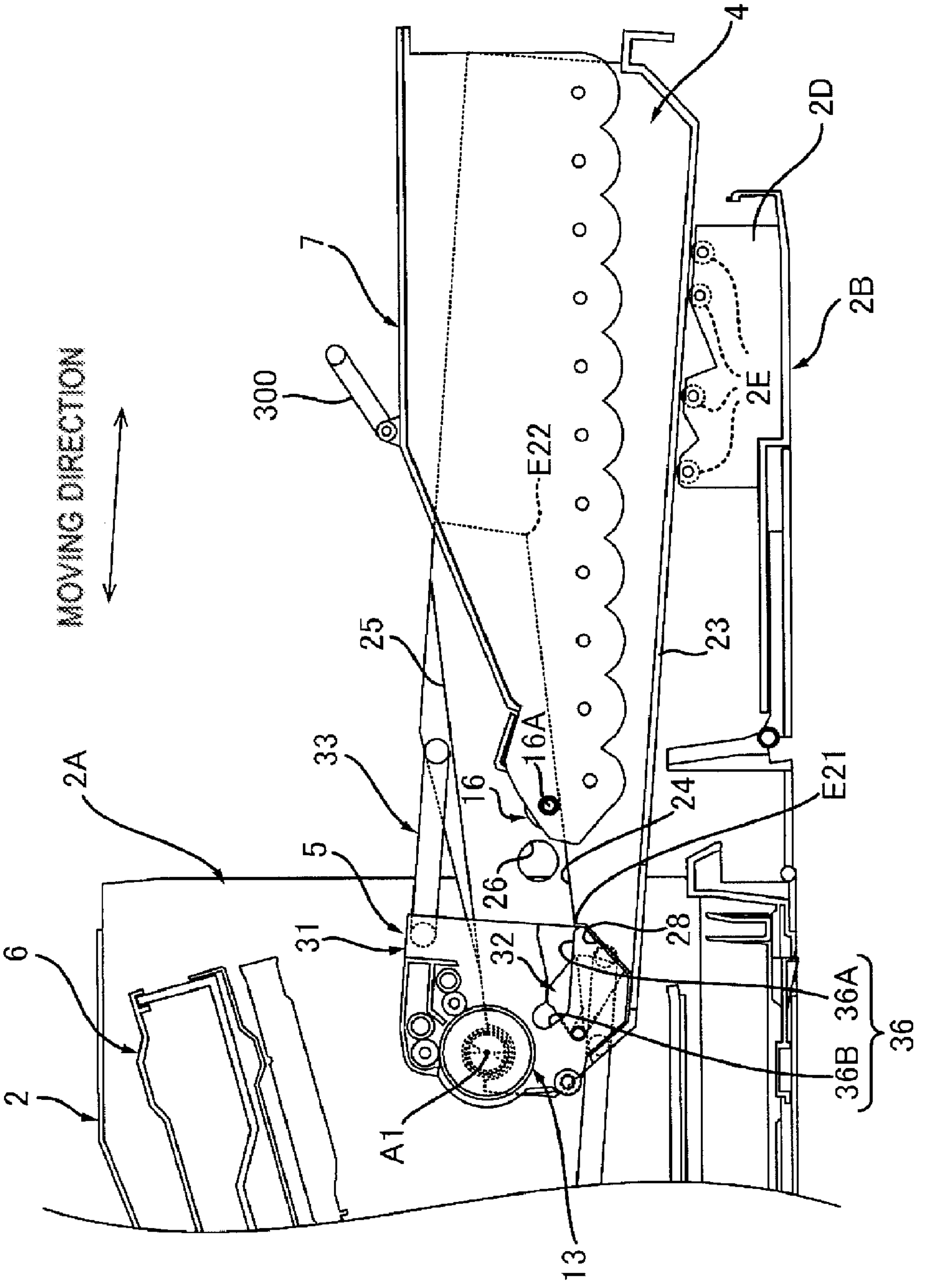
FIG. 8 illustrates mounting of the developing cartridge to the drawer, depicting an aspect where the developing cartridge is guided by a first guide of the drawer.

Also, as shown in FIG. 8, in the state where the drawer 4 supporting the drum cartridge 5 is located at the outer position and the developing cartridge 7 is attached to the drawer 4, the shaft 16A of the developing roller 16 is fitted in the first guide 24. Thereby, the first guide 24 guides the developing cartridge 7 when the developing cartridge 7 is attached to the drawer 4.

As shown in FIG. 5, the handle support part 25 extends in parallel with the first guide 24. The handle support part 25 is spaced upward from the first guide 24. The handle support part 25 is located on the inner surface of the first drawer side plate 21 in the axial direction. The handle support part 25 is concave in a direction of getting away from the second drawer side plate 22 in the axial direction. As shown in FIG. 8, the handle support part 25 is configured to support the handle 33 at a position at which a space, in which the developing cartridge 7 is mountable between the handle 33 and the bottom plate 23 of the drawer 4, remains in the state where the drum cartridge 5 is attached to the first supporting position on the drawer 4.

As shown in FIG. 5, the through-hole 26 is located between the first guide 24 and the handle support part 25 in the vertical direction. The through-hole 26 has a circular shape. In the state where the developing cartridge 7 is attached to the second supporting position on the drawer 4, a developing coupling 71 (see FIG. 2) of the developing cartridge 7 is located at an inner side of the first drawer side plate 21, and is exposed through the through-hole 26. In the state where the drum cartridge 5 and the developing cartridge 7 are attached to the drawer 4 and the drawer 4 is located at the inner position, a main body coupling 101 (see FIG. 2) is coupled to the developing coupling 71. At this time, the main body coupling 101 is inserted in the through-hole 26.

The notch 27A is located at the first end E11 of the first drawer side plate 21. The notch 27A has a semicircular shape. In the state where the drum cartridge 5 is attached to the first supporting position on the drawer 4, the drum coupling 131 of the drum cartridge 5 is fitted in the notch 27A. Thereby, in the state where the drum cartridge 5 is attached to the first supporting position on the drawer 4, the drum coupling 131 (see FIGS. 4 and 6) of the drum cartridge 5 is exposed through the notch 27A. In the state where the drum cartridge 5 and the developing cartridge 7 are attached to the drawer 4 and the drawer 4 is located at the inner position, a main body coupling 102 (see FIG. 2) is coupled to the drum coupling 131.

The concave part 28 is located between the first guide 24 and the first end E11 of the first drawer side plate 21 in the moving direction. The concave part 28 is located on the inner surface of the first drawer side plate 21 in the axial direction. The concave part 28 is concave in a direction of getting away from the second drawer side plate 22 in the axial direction. A first drum side plate 34 of the frame 31 is fitted in the concave part 28 in the state where the drum cartridge 5 is attached to the first supporting position on the drawer 4.

As shown in FIG. 4, the second drawer side plate 22 is located at the second end of the drawer 4 in the axial direction. The second drawer side plate 22 is spaced from the first drawer side plate 21 in the axial direction. The second drawer side plate 22 has the same shape as the first drawer side plate 21, except that it is not formed with the through-hole 26. That is, the second drawer side plate 22 has a notch 27B having the same shape as the notch 27A of the first drawer side plate 21. In the state where the drum cartridge 5 is attached to the first supporting position on the drawer 4, the drum flange 132 of the drum cartridge 5 is fitted in the notch 27B.

The bottom plate 23 is located between the first drawer side plate 21 and the second drawer side plate 22 in the axial direction. The bottom plate 23 extends in the axial direction. A first end of the bottom plate 23 in the axial direction is connected to the first drawer side plate 21. A second end of the bottom plate 23 in the axial direction is connected to the second drawer side plate 22.

3. Details of Drum Cartridge

Subsequently, details of the drum cartridge 5 are described with reference to FIGS. 4 and 6 to 8.

Figure 6:
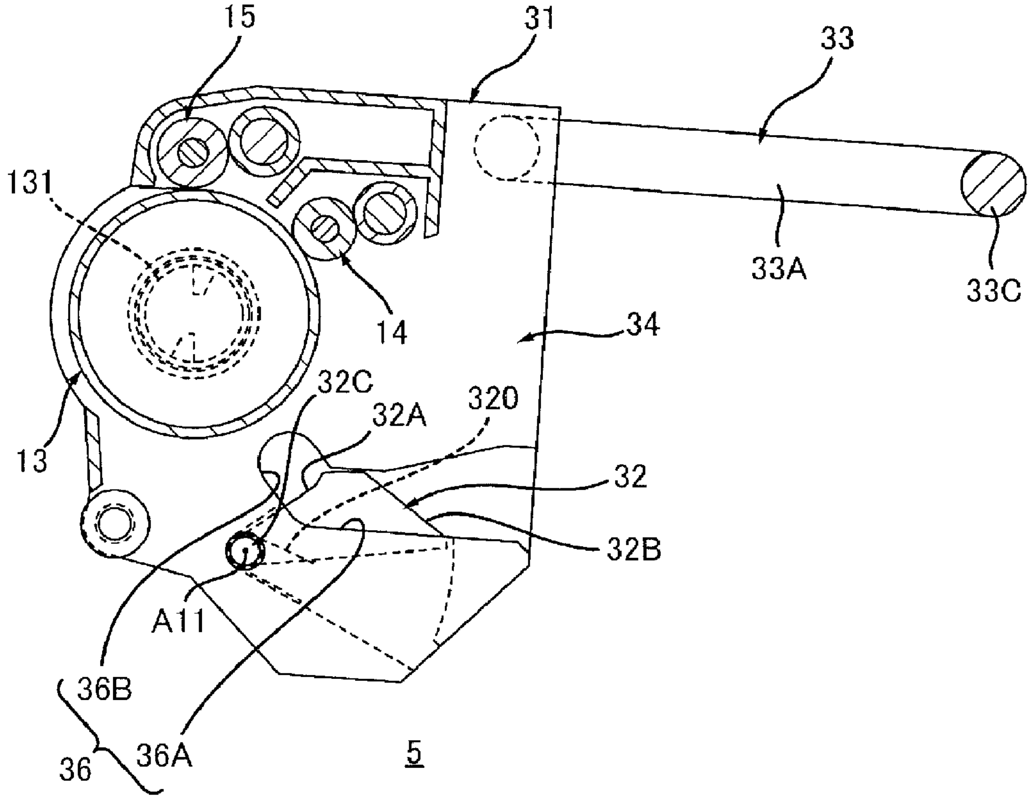
FIG. 6 is a sectional view of the drum cartridge shown in FIG. 1 at an axial center.

As shown in FIG. 6, the drum cartridge 5 includes a frame 31, a pressing member 32, and a handle 33, in addition to the photosensitive drum 13, the charging roller 14 and the primary holding roller 15.

3.1 Frame

The frame 31 is configured to support the photosensitive drum 13, the charging roller 14 and the primary holding roller 15. As shown in FIG. 4, the frame 31 extends in the axial direction. The frame 31 has a first drum side plate 34 and a second drum side plate 35.

The first drum side plate 34 is located at a first end of the frame 31 in the axial direction. The first drum side plate 34 extends in a direction of intersecting with the axial direction. Preferably, the first drum side plate 34 extends in a direction perpendicular to the axial direction. As shown in FIG. 6, the first drum side plate 34 includes a second guide 36. That is, the drum cartridge 5 includes the second guide 36.

Figure 9:
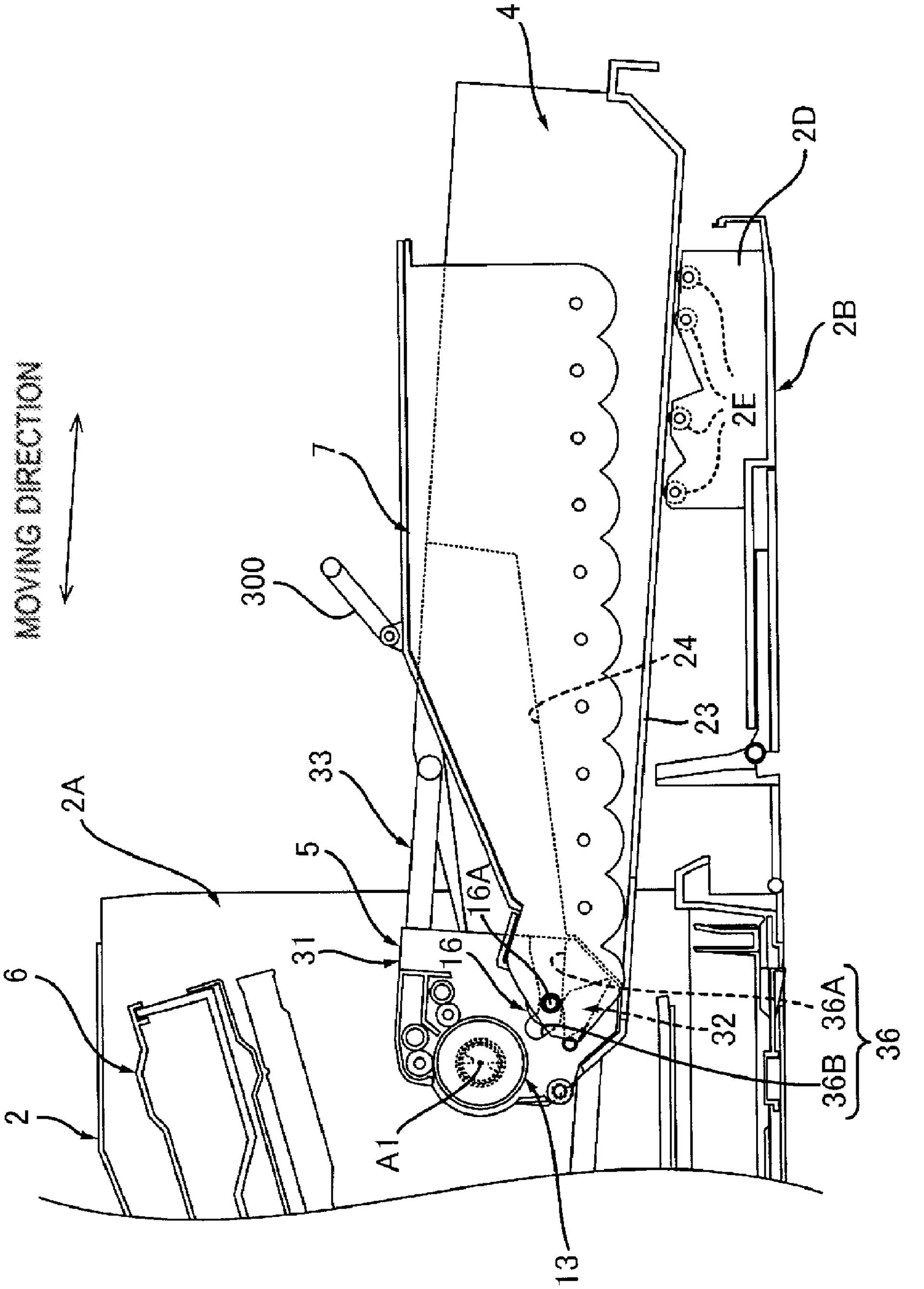
FIG. 9 illustrates mounting of the developing cartridge to the drawer, depicting an aspect where the developing cartridge is guided by a second guide of the drum cartridge.

As shown in FIG. 8, the second guide 36 is located below the rotary axis A1 of the photosensitive drum 13 in the state where the drum cartridge 5 is attached to the first supporting position on the drawer 4. As shown in FIG. 9, in the state where the drum cartridge 5 and the developing cartridge 7 are attached to the drawer 4, the shaft 16A of the developing roller 16 is fitted in the second guide 36. As shown in FIG. 6, the second guide 36 has a first part 36A and a second part 36B.

As shown in FIG. 8, the first part 36A becomes continuous with the first guide 24 in the state where the drum cartridge 5 is attached to the first supporting position on the drawer 4. That is, the second guide 36 becomes continuous with the first guide 24 in the state where the drum cartridge 5 is attached to the first supporting position on the drawer 4. Thereby, as shown in FIGS. 8 and 9, the second guide 36 is capable of guiding the developing cartridge 7 when the developing cartridge 7 is attached to the drawer 4 in the state where the drum cartridge 5 is attached to the first supporting position on the drawer 4. In other words, the first guide 24 and the second guide 36 configures a developing cartridge guide configured to guide the developing cartridge 7. The first part 36A extends in a direction of intersecting with the direction in which the first guide 24 extends. Specifically, the first part 36A extends in the moving direction of the drawer 4 in the state where the drum cartridge 5 is attached to the first supporting position on the drawer 4. However, the first part 36A does not necessarily need to extend in the direction of intersecting with the direction in which the first guide 24 extends. The first part 36A needs to be at least smoothly coupled to the first guide 24 without a step in the state where the drum cartridge 5 is attached to the first supporting position on the drawer 4. When the first part 36A is smoothly coupled to the first guide 24 without a step, it is possible to suppress the developing cartridge 7 from being caught at a joint line between the first guide 24 and the first part 36A while mounting the developing cartridge 7 to the drawer 4, so that it is possible to smoothly mount the developing cartridge 7 to the drawer 4.

The second part 36B is located between the first part 36A and the photosensitive drum 13. The second part 36B extends in a direction of intersecting with both the direction in which the first part 36A extends and the direction in which the first part 36A extends. Specifically, the second part 36B extends in a direction of connecting the rotary axis A1 of the photosensitive drum 13 and a rotary axis A2 (see FIG. 1) of the developing roller 16 in the state where the drum cartridge 5 and the developing cartridge 7 are attached to the drawer 4. The second part 36B is connected to the first part 36A.

As shown in FIG. 4, the second drum side plate 35 is located at the other end portion of the frame 31 in the axial direction. The second drum side plate 35 is spaced from the first drum side plate 34 in the axial direction. The second drum side plate 35 has the same shape as the first drum side plate 34.

3.2 Pressing Member

As shown in FIG. 6, the pressing member 32 is provided in the first drum side plate 34.

The pressing member 32 is configured to be pivotable relative to an axis A11 between an advance position (see FIG. 6) at which the pressing member is advanced into the second guide 36 and a retreat position (not shown) at which the pressing member is retreated from the second guide 36. The pressing member 32 is pressed from the retreat position toward the advance position by a torsion spring 320. Specifically, the pressing member 32 has a first surface 32A, a second surface 32B, and a shaft 32C.

The first surface 32A extends in a direction of intersecting with the direction of connecting the rotary axis A1 (see FIG. 1) of the photosensitive drum 13 and the rotary axis A2 (see FIG. 1) of the developing roller 16, in a state where the pressing member 32 is located at the advance position. Preferably, the first surface 32A extends in a direction perpendicular to the direction of connecting the rotary axis A1 (see FIG. 1) of the photosensitive drum 13 and the rotary axis A2 (see FIG. 1) of the developing roller 16, in the state where the pressing member 32 is located at the advance position. In a state where the drum cartridge 5 and the developing cartridge 7 are attached to the drawer 4 and the pressing member 32 is located at the advance position, the first surface 32A is in contact with the shaft 16A of the developing roller 16. In the state where the drum cartridge 5 and the developing cartridge 7 are attached to the drawer 4 and the pressing member 32 is located at the advance position, the pressing member 32 is configured to press the shaft 16A of the developing roller 16 toward the photosensitive drum 13.

The second surface 32B is located more distant from the second part 36B than the first surface 32A, in a direction in which the first part 36A of the second guide 36 extends. The second surface 32B is inclined relative to the direction in which the first part 36A extends.

The shaft 32C extends along the axis A11. The shaft 32C has a circular column shape. The pressing member 32 is configured to be rotatable relative to the shaft 32C.

Here, the pressing member 32 is also provided to the second drum side plate 35 and is configured to press the shaft 16A of the developing roller 16 toward the photosensitive drum 13, like the pressing member 32 of the first drum side plate 34.

3.3 Handle

The handle 33 is gripped by the user when mounting and demounting the drum cartridge 5 to and from the drawer 4. The handle 33 is attached to the frame 31. Specifically, as shown in FIG. 4, the handle 33 has a first arm 33A, a second arm 33B, and a bar 33C.

The first arm 33A is located at a first end of the handle 33 in the axial direction. The first arm 33A is rotatably mounted to the first drum side plate 34 of the frame 31. The first arm 33A extends in a direction of intersecting with the axial direction. Preferably, the first arm 33A extends in a direction perpendicular to the axial direction.

The second arm 33B is located at a second end of the handle 33 in the axial direction. The second arm 33B is spaced from the first arm 33A in the axial direction. The second arm 33B is rotatably mounted to the second drum side plate 35 of the frame 31. The first arm 33A is rotatably mounted to the first drum side plate 34 and the second arm 33B is rotatably mounted to the second drum side plate 35, so that the handle 33 is rotatably mounted to the frame 31. The second arm 33B extends in a direction of intersecting with the axial direction. Preferably, the second arm 33B extends in a direction perpendicular to the axial direction.

The bar 33C is located between the first arm 33A and the second arm 33B in the axial direction. The bar 33C extends in the axial direction. The bar 33C has a circular column shape. A first end of the bar 33C in the axial direction connects to the first arm 33A. A second end of the bar 33C in the axial direction connects to the second arm 33B.

4. Mounting of Drum Cartridge and Developing Cartridge to Drawer

Subsequently, mounting of the drum cartridge 5 and the developing cartridge 7 to the drawer 4 is described with reference to FIGS. 7 to 9.

As shown in FIG. 7, the first guide 24 is located outside the main body housing 2 in the state where the drawer 4 is located at the outer position.

When the drum cartridge 5 is attached to the first supporting position on the drawer 4, the frame 31 is fitted in the first guide 24 in the state where the drawer 4 is located at the outer position, so that the drum cartridge 5 is guided from the outside of the main body housing 2 toward the inside of the main body housing 2 in the direction in which the first guide 24 extends, as shown in FIGS. 7 and 8.

Then, as shown in FIG. 8, when the first drum side plate 34 of the frame 31 is fitted in the concave part 28 of the drawer 4, the mounting of the drum cartridge 5 to the drawer 4 is completed.

In the state where the drum cartridge 5 is attached to the first supporting position on the drawer 4, at least a part of the drum cartridge 5 is located inside the main body housing 2. Specifically, in the state where the drum cartridge 5 is attached to the first supporting position on the drawer 4 and the drawer 4 is located at the outer position, the second guide 36 is located inside the main body housing 2. Also, in the state where the drum cartridge 5 is attached to the first supporting position on the drawer 4 and the drawer 4 is located at the outer position, the frame 31 is located inside the main body housing 2. On the other hand, in the state where the drum cartridge 5 is attached to the first supporting position on the drawer 4 and the drawer 4 is located at the outer position, the handle 33 is located outside the main body housing 2.

Also, in the state where the drum cartridge 5 is attached to the first supporting position on the drawer 4, the second guide 36 of the drum cartridge 5 continues to the first guide 24 of the drawer 4.

Next, when the developing cartridge 7 is attached to the second supporting position on the drawer 4, the shaft 16A of the developing roller 16 is guided toward the second guide 36 by the first guide 24 and is fitted in the first part 36A of the second guide 36 in the state where the drum cartridge 5 is attached to the first supporting position on the drawer 4 and the drawer 4 is located at the outer position, as shown in FIGS. 8 and 9.

Then, the shaft 16A is guided by the first part 36A of the second guide 36 and comes into contact with the second surface 32B (see FIG. 6) of the pressing member 32. Then, in the state where the shaft 16A is in contact with the second surface 32B, when the shaft 16A is further advanced in a direction of coming close to the second part 36B, the shaft 16A presses the second surface 32B to push down the pressing member 32 from the advance position toward the retreat position against the pressing force of the torsion spring 320. Then, as shown in FIG. 9, when the pressing member 32 is located at the retreat position, the shaft 16A passes above the pressing member 32 and is fitted in the second part 36B.

When the shaft 16A is fitted in the second part 36B, the pressing member 32 is returned from the retreat position to the advance position by the pressing force of the torsion spring 320, thereby pressing the shaft 16A toward the photosensitive drum 13. Then, as shown in FIG. 1, the developing roller 16 comes into contact with the photosensitive drum 13, so that the mounting of the developing cartridge 7 to the drawer 4 is completed.

5. Operational Effects

As shown in FIG. 7, according to the image forming apparatus 1, the drum cartridge 5 includes the photosensitive drum 13 and is attachable to and detachable from the drawer 4. Also, as shown in FIG. 8, the developing cartridge 7 includes the developing roller 16 and is attachable to and detachable from the drawer 4.

For this reason, it is possible to individually replace the drum cartridge 5 including the photosensitive drum 13 and the developing cartridge 7 including the developing roller 16, in the image forming apparatus 1 including the drawer 4.

Thereby, it is possible to replace each of the drum cartridge 5 and the developing cartridge 7 at an appropriate time, in conformity to each lifetime.

Also, as shown in FIG. 8, according to the image forming apparatus 1, in the state where the drum cartridge 5 is attached to the first supporting position on the drawer 4, the first guide 24 of the drawer 4 and the second guide 36 of the drum cartridge 5 configures the developing cartridge guide configured to guide the developing cartridge.

Thereby, when the developing cartridge 7 is attached to the drawer 4, it is possible to guide the developing cartridge 7 by the first guide 24 of the drawer 4 and the second guide 36 of the drum cartridge 5. In other words, the developing cartridge guide is configured to guide the developing cartridge 7 from a first position where the developing roller is spaced from the photosensitive drum 13 toward a second position where the developing roller 7 is in contact with the photosensitive drum 13. The developing cartridge guide is configured to continuously guide the developing cartridge 7 via the first guide 24 and the second guide 36.

As a result, it is possible to guide the developing cartridge 7 to the drum cartridge by using the drawer 4 while making the drum cartridge 5 small.

Also, as shown in FIG. 8, according to the image forming apparatus 1, a part of the drum cartridge 5 is located inside the main body housing 2 in the state where the drum cartridge 5 is attached to the first supporting position on the drawer 4 and the drawer 4 is located at the outer position. Specifically, in the state where the drum cartridge 5 is attached to the first supporting position on the drawer 4 and the drawer 4 is located at the outer position, the second guide 36 is located inside the main body housing 2. Also, in the state where the drum cartridge 5 is attached to the first supporting position on the drawer 4 and the drawer 4 is located at the outer position, the frame 31 is located inside the main body housing 2.

For this reason, it is possible to mount the developing cartridge 7 to the drawer 4 in a state where the drawer 4 is pulled out by a distance at which a part of the drum cartridge is located inside the main body housing 2, thereby shortening the distance required to pull out the drawer 4. For this reason, it is possible to reduce a space required to replace the developing cartridge 7.

Also, as shown in FIG. 7, according to the image forming apparatus 1, the first guide 24 is configured to guide the drum cartridge 5 when the drum cartridge 5 is attached to the drawer 4 in the state where the drawer 4 is located at the outer position.

For this reason, it is possible to guide both the mounting of the developing cartridge 7 to the drawer 4 and the mounting of the drum cartridge 5 to the drawer 4 by the first guide 24, and thus, it is possible to suppress the structure of the image forming apparatus 1 from becoming complicated.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a main body housing having a space inside, the main body housing comprising:

a front wall having an opening; and a rear wall, the front wall and the rear wall defining a space therebetween;

a drum cartridge comprising a photosensitive drum and a guide, the drum cartridge being movable between an inner position where the drum cartridge is accommodated inside the space and an outer position where at least a part of the drum cartridge is drawn out of the space through the opening;

a developing cartridge comprising a developing roller, the developing cartridge is detachably attachable to the guide on the drum cartridge; and a drawer movably supported by the main body housing, wherein the drum cartridge is detachably attachable to a first supporting position on the drawer, wherein the drawer moves the drum cartridge between the inner position and the outer position as the drawer moves with respect to the main body housing when the drum cartridge is attached to the first supporting position, and wherein a length of the drum cartridge in a movement direction that the drawer moves is shorter than a length of the developing cartridge in the movement direction.

2. The image forming apparatus according to claim 1, further comprising an exposure device configured to expose the photosensitive drum, the exposure device located above the developing cartridge when the drum cartridge is at the inner position and the developing cartridge is attached to the guide on the drum cartridge.

3. The image forming apparatus according to claim 2, further comprising a transfer roller located nearer to the rear wall than the developing roller, in the movement direction, when the drum cartridge is at the inner position and the developing cartridge is attached to the guide on the drum cartridge.

4. The image forming apparatus according to claim 1, wherein the drum cartridge includes a pressing mechanism configured to press the developing roller toward the photosensitive drum.

5. The image forming apparatus according to claim 4, wherein the developing roller includes a shaft guided by the guide of on the drum cartridge, wherein the pressing mechanism includes:

a pressing member configured to be movable between an advance position at which the pressing member is advanced into the guide and a retreat position at which the pressing member is retreated from the guide; and a spring configured to press the pressing member from the retreat position toward the advance position, and wherein the pressing mechanism press the shaft toward the photosensitive drum.

6. An image forming apparatus comprising:

a main body housing having a space inside, the main body housing comprising:

a front wall having an opening; and a rear wall, the front wall and the rear wall defining a space therebetween;

a drum cartridge comprising a photosensitive drum and a guide, the drum cartridge being movable between an inner position where the drum cartridge is accommodated inside the space and an outer position where at least a part of the drum cartridge is drawn out of the space through the opening; and a developing cartridge comprising a developing roller, the developing cartridge is detachably attachable to the guide on the drum cartridge, wherein a length of the drum cartridge in a movement direction is shorter than a length of the developing cartridge in the movement direction, and the drum cartridge includes a pressing mechanism configured to press the developing roller toward the photosensitive drum.

7. The image forming apparatus according to claim 6, wherein the developing roller includes a shaft guided by the guide of on the drum cartridge, wherein the pressing mechanism includes:

a pressing member configured to be movable between an advance position at which the pressing member is advanced into the guide and a retreat position at which the pressing member is retreated from the guide; and a spring configured to press the pressing member from the retreat position toward the advance position, and wherein the pressing mechanism press the shaft toward the photosensitive drum.

* * * * *